Oct. 31, 1967 W. C. UTSCHIG 3,349,749
PRODUCTION OF GLOSSY COATED PAPER
Original Filed April 3, 1959
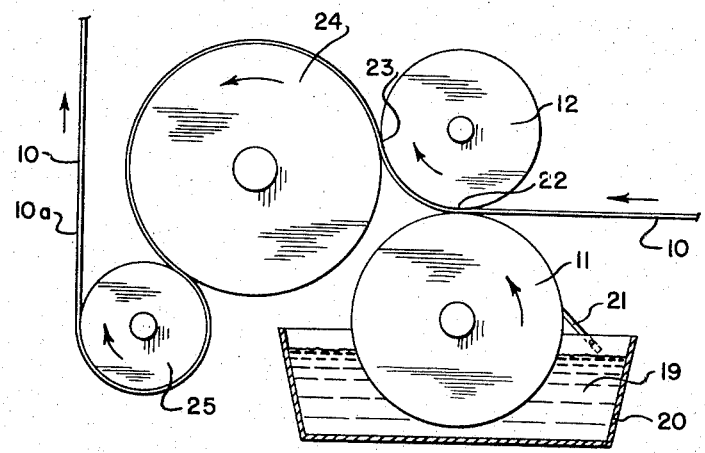
FIG. 1
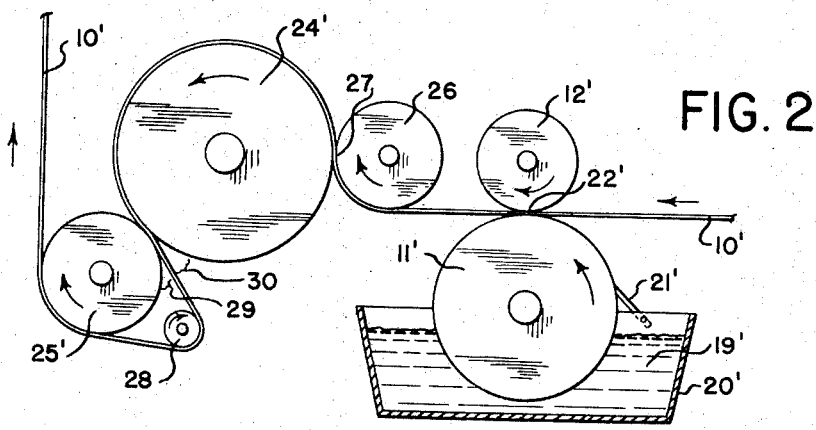
FIG. 2
FIG. 5
FIG. 3
FIG. 4
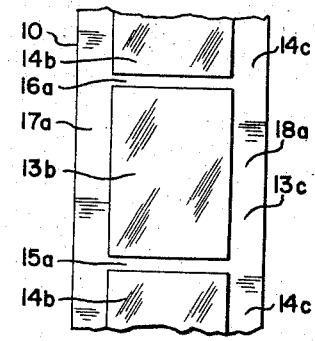
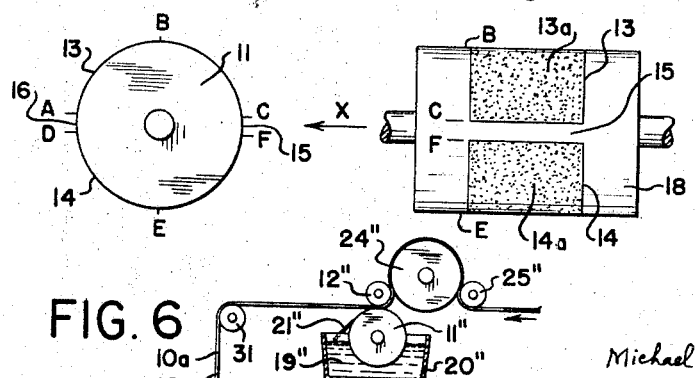
FIG. 6
INVENTOR
Walter C. Utschig
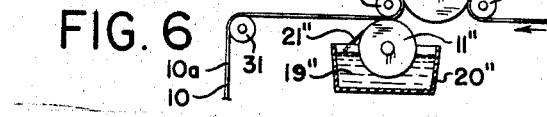
ATTORNEYS United States Patent Office 3,349,749
Patented Oct. 31, 1967

3,349,749
PRODUCTION OF GLOSSY COATED PAPER
Walter C. Utschig, White Plains, N.Y., assignor to General Foods Corporation, White Plains, N.Y., a corporation of Delaware
Continuation of application Ser. No. 804,020, Apr. 3, 1959. This application Oct. 5, 1964, Ser. No. 406,213
1 Claim. (Cl. 118—60)

The present application in a continuation of application Ser. No. 804,020 filed Apr. 3, 1959, and entitled, Production of Glossy Coated Paper, now abandoned.

This invention relates to a method of and apparatus for continuously producing paper having a smooth glossy coating thereon of thermoplastic material such as wax. In particular, the method makes it possible to produce, at low cost, paper sheet material having high gloss and other protective qualities heretofore available at a higher cost. The economies provided are such that paper products are producible that have the gloss and durability of cellophane and other expensively finished paper and yet cost less than even inexpensively finished paper such as, say, lacquer coated paper.

The method generally comprises producing smooth high gloss paper especially suitable for use in or on cartons by printing a thermoplastic agent on one side of a paper web. The web is continuously moved relatively to the agent applicator so that agent is continuously applied to spaced areas of the paper in the form of successive, longitudinally spaced coats, each coat being substantially continuous in respect of its covering of or extension on the paper. The method is particularly characterized by the fact that very small amounts of agent are applied, and furthermore the amount is subject to close control, so that the applied coats are quite thin. Then, while maintaining the coated agent in a plastic state, the web is passed onto a smooth cooled surface and coincidently therewith the coated agent is pressed against said surface, thereby rapidly hardening the agent and smoothening each coat so that it becomes more uniformly continuous. Coincidently with the smoothening effect a high gloss is imparted to each coat. In particular, no solvent is used for dissolving or applying the agent, thus avoiding not only the expense of a solvent but also the handling inconveniences attendant on its use, including the removal of the same from the coated paper.

The invention may be better understood by referring to the accompanying drawing wherein:

FIG. 1 diagrammatically illustrates one method of carrying out the invention;

FIG. 2 diagrammatically illustrates a modified method;

FIG. 3 represents an end view of a roll used in the methods of FIGS. 1 and 2;

FIG. 4 is a view of FIG. 3 looking in the direction of arrow X;

FIG. 5 is a broken-off plan view of a paper product produced according to the invention; and FIG. 6 is a reduced view diagrammatically illustrating a method for applying thermoplastic agent to the opposite side of the paper.

In FIG. 1 a continuously moving web 10 of paper is shown moving into the nip of a lower roll 11 and an upper roll 12. Roll 11 is a steel roll whose cylindrical surface has on it two circumferentially spaced areas 13 and 14 (FIGS. 3 and 4) each of which comprises a multiplicity of closely spaced shallow recesses 13a and 14a produced by etching the cylindrical surface of the roll. The recessed or recess-containing area 13 extends from A through B to C, and the area 14 extends from D through E to F. As will be apparent, the areas are spaced from each other by unetched portions in the form of the strips 15 and 16, strip 15 having the width denoted by CF and strip 16 the width of AD. Areas 13 and 14 are also spaced from each end of the roll as shown by the unetched strips 17 and 18 which extend circumferentially of the cylinder. The roll 11, which is heated by conventional means not shown, is partly immersed in a bath 19 of melted thermoplastic agent, such as wax, contained in trough 20, and as roll 11 rotates in the bath, the recesses or cells in the areas 13 and 14 pick up melted wax and deposit or print the same on one side of the moving web, the wax being deposited in the form of successive longitudinally spaced coats each corresponding to one of said recessed areas. The upper roll 12, termed an impression roll, is preferably made of rubber and serves to press the paper web into contact with the roll 11, and as may be apparent, the paper web has greater affinity for the wax than the roll 11. Means such as a conventional doctor blade 21 is employed to remove excess wax from the surface of the etched roll just prior to the application of the wax to the paper.

Printed wax coats are shown in FIG. 5 at 13b and 14b, the successive coats being longitudinally spaced from one another on the paper 10. Each deposited coat is substantially continuous, that is, it substantially completely covers an area on the paper co-extensive in size and shape with one of said recessed areas. This result is produced by virtue of the close spacing of the recesses, the wax deposited from each recess tending to spread and merge with the depositions from adjacent recesses. The thickness of the deposited wax coating is very small and corresponds with the shallowness of the recesses.

In this connection it will be understood that individual coated sheets, as indicated at 13c and 14c, may be produced by cutting transversely of web 10 (FIG. 5) and centrally through the portions indicated at 15a and 16a.

The impression roll 12 is continuously heated, being maintained at an elevated temperature approximating or exceeding the melting point of the wax during contact of the roll with the paper web. As the moving web passes through and out of the nip between rolls 11 and 12, the heated roll 12, by virtue of making contact with the web between points 22 and 23, maintains the coating on the web in a substantially plastic state. At the point 23 the web passes through the nip of roll 12 and roll 24, the latter comprising a cold, substantially hollow, casting roll having a smooth, mirror-finished, cooled, cylindrical surface. The surface of roll 24 is uniformly cooled by means of a brine which circulates within the roll, the circulating equipment being conventional and therefore not shown. The temperature of the cooled roll surfaces depends on the coating agent, but an illustrative temperature range is 0 to 60° F. with a preferred range of about 30 to 40° F. Cooling of the wax on the paper web is quite rapid after initial contact with the cold roll. The impression roll 12 acts to press the coated wax against the smooth surface of roll 24 to smoothen the wax coating so that it becomes more uniformly continuous. Coincidently with the smoothening effect, the smooth mirror-finished surface of roll 24 imparts a high gloss to the wax coating. To insure these results it is essential that the wax coating shall be in a substantially plastic state at the point of initial contact with cold roll 24; the desired plasticity of the wax may be obtained by keeping the distance traveled by the paper web between the etched roll 11 and the cold roll 24 as short as practical, and further, by heating the coating through the medium of the heated impression roll 12 to maintain the coating in a plastic state up to its initial contact with roll 24. Heat may also be applied to the coating intermediate points 22 and 23 as by means of suitably placed infrared heaters (not shown).

The coated web travels a substantial distance while in contact with the smooth cooled surface of roll 24, such distance being sufficient to insure cooling of the wax to a temperature substantially below its melting point and to effect the smoothening and gloss-producing actions noted. If desired, additional cooling means may be employed, such as a plurality of air jets (not shown) disposed over and spaced close to the roll 24 so as to follow the curvature thereof for a substantial distance, say up to one-half or more of the circumference of the roll, and adapted to blow streams of cold air, preferably high velocity air, on the exposed side of the web throughout its width. The web having the wax hardened or solidified thereon in the form of thin successive longitudinally spaced coats or sheets is then removed from the casting roll by passing it over a take-off roll 25, from which it is removed and collected on a driven wind-up roll, not shown. Peeling off of the web from roll 24 is controlled by the roll 25, which has a soft rubber surface and which is in pressure contact with the web-covered roll 24. The rotational axis of roll 25 is substantially parallel to that of roll 24 to avoid any eccentricity in the peeling step and any distortion of the wax coating or tearing of the web.

Considering the method in some further detail, the etched roll 11 is preferably made of steel and preferably is acid etched. As indicated, the tiny, shallow recesses or cells of the etched surface hold the thermoplastic agent. The cells are so close together that the deposited agent will completely cover the surface of the paper web, that is, the roll prints such surface with agent owing to the tendency of the agent, as deposited from each cell, to spread and merge with deposited agent from adjacent cells. In the result, an integral body of thermoplastic agent is deposited or printed on the paper. The body is substantially continuous and is made uniformly continuous when the coated paper web is pressed against the smooth casting roll 24 by the impression roll 12. If the agent is not sufficiently plastic at the moment it strikes the cold casting roll, the resulting coating will not be smooth but will be apt to show ridges or corrugations which sometimes are palpable and which in any event are visible. Care is therefore exercised to insure that the deposited agent is kept in a plastic state up to the time it makes contact with roll 24.

It will be understood that more than two recess-containing areas may be present in the surface of the etched roll, and that if desired, only one such area need be present, the end borders of which are spaced from each other to provide an unetched strip portion extending parallel to the rotational axis of the roll.

The use of the etched roll permits a very small amount of agent to be applied to the paper, on the order of 0.5 to 3 lbs. of agent per 3000 sq. ft. of paper. As will be recognized, this amount is considerably lower than in conventional thermoplastic coating procedures. It is a particular merit of the etched roll that excess agent is avoided. These facts, and the further fact that no solvent for the agent is involved, make it practical to employ better grades of agent to produce high gloss, high quality, durable paper having resistance to the passage therethrough of water and water vapor while holding down the cost of the same. Furthermore, the etched roll permits spaced areas of agent to be applied, the spacing between and around such areas, note the uncoated strip portions 15a, 16a, 17a, and 18a of FIG. 5, permitting such portions of the resulting paper product, such as sheet 13c, to be glued in the subsequent use of the sheet as, say, a wrap for a carton. Not least of the advantages of the etched roll is the fact that the amount of agent applied can be closely controlled by selecting a roll having appropriately sized recesses.

The cold roll 24, on which is provided the smooth surface necessary to produce the high gloss, preferably has a coating on such surface comprising a continuous and extremely smooth sheet of material such as vinyl acetate. This sheet possesses good release properties, that is, readily permits the coated paper web to be peeled off therefrom, and it has such a high degree of smoothness as to insure production of a continuous surface on the film or coating which is cast onto the web of paper. Instead of vinyl acetate, other compositions capable of offering a smooth, mirror-finished surface and good release properties may be employed, such as a sheet of copper or aluminum foil, or a lacquer or silicone or other resin. If desired, roll 24 may also comprise a polished metal roll, or a nickel- or chromium-plated roll. In general, the casting surface of the cold roll should have a mirror-like finish and should have a surface which, when cooled to substantially below the fusion point of the coating on the paper, adheres to such coating with only a slight bond such that the coated paper can be readily peeled therefrom.

If desired, the cold roll may be replaced by an endless belt having a smooth mirror-finished surface, although a roll is preferred.

In FIG. 2 a modified procedure is shown. The primed numerals represent structures shown and described in FIG. 1 and therefore no further description of them will be given. In FIG. 2 a second rubber impression roll 26 is disposed between the roll 12' and the roll 24' to aid in the passage of the web between the points 22' and 27. Roll 26 and roll 12' are both heated to help maintain the temperature of the coating close to its melting point. As in the case of FIG. 1, heat may also be applied to the coating intermediate rolls 12' and 26 as by means of infrared heaters (not shown), and similarly, the web on roll 24' may be cooled by means of the above described cold air jets (not shown).

A roll 28 is provided to receive the web as it leaves the nip of rolls 24' and 25'. It may be noted, in passing, that roll 28 is positioned so that the angles indicated at 29 and 30, that is, the angles formed by the web and the rolls 24' and 25', are almost the same, although preferably they are not. One of the angles preferably is slightly different from the other so that as the web leaves the nip it tends to follow one of the rolls to a slight extent. This arrangement tends to prevent fluttering of the web, which could lead to possible breakage of the same, and to eliminate wrinkling.

In both FIGS. 1 and 2, the driven rolls are the etch and windup rolls, although it is preferred to drive the casting roll as well. Rolls 12, 15, 12', 26, 28, and 25' are idling rolls. It may be noted that the rubber-surfaced rolls help eliminate slippage of the web. Conventional means, such as electric eyes, may be employed to maintain the paper web in registry with the etched areas on roll 11 as well as with the other rolls of the equipment.

The web 10 may comprise any suitable paper, in most cases a paper capable of being printed, in the range of 8 to 90 lbs. (basis 24 x 36—500=3000 sq. ft.). Various kinds of paper are known, and as examples any of the following can be used; papers made from chemical pulps including sulphate papers, sulphite papers, sulphate-sulphite combination papers, and soda pulp papers, these various papers being either uncoated or coated on one or both sides with a coating comprising clay, titanium dioxide, and binder; also papers made from chemical pulp or chemical pulp and groundwood combinations, coated or uncoated, which have been calendered or supercalendered, and including such papers as publishing papers, glassine, supercalendered sulphite papers, machine finish sulphite-sulphate papers, and machine finish and machine glazed sulphite-sulphate papers. Other materials are cellulosic films including cellophane and cellulose acetate; also foil of aluminum or tin.

By the term "paper web" it is intended to include webs of paper of the types noted, plastic films, metal foil, paperboard, laminated materials comprising one or more plies of paper laminated to one or more plies of paperboard in any suitable way by means of any suitable laminant, and the like.

Paperboard, when used, may include boards made from pure chemical pulps such as bleached and unbleached kraft; soda and sulphite boards; boards made from semichemical pulp such as corrugating medium board and bleached semichemical board; boards made from waste materials such as chip board and jute board; and boards made from combinations of waste, groundwood and chemical pulps such as White Patent coated news board, double manila lined news, groundwood center and double bleached lined waste-groundwood center board. Such board is normally specified in weight per 1000 sq. ft. and in points thickness (one point=0.001 inch); and on this basis any of the above types of board in the range of 20 to 160 lbs. per 1000 sq. ft. and 5 to 40 points may be suitable for use.

The coating composition is preferably a thermoplastic agent such as paraffin wax, microcrystalline wax, polyethylene of low molecular weight, say in the range of about 2000 to 21,000, etc. Also, other thermoplastic resins besides polyethylene are suitable, such as polypropylene of low molecular weight, polyterpenes, petroleum resins, or any other suitable resin having thermoplastic properties. Mixtures of two or more of the foregoing agents are suitable, such as a combination of paraffin wax and microcrystalline wax or polyethylene. The agent should, of course, be capable of producing gloss and protective properties when deposited on the web, and its melting point should not be so high as to injure the web. In general, the particular composition to be used will depend on the particular product desired. For example, for a product having high gloss, moderate WVT (water vapor transfer) properties and good scuffproofness, a suitable agent is polyethylene having a molecular weight of 2000 to 14,000.

The coated paper product has an extremely glossly, smooth, and continuous surface that is entirely free of imperfections such as "crow's feet." Gloss values of at least 90% reflectance, and even approaching 100% reflectance, are attainable, as measured by the Photovolt reflection meter. These values compare favorably with cellophane, which has a gloss of essentially 100% reflectance, and are superior to those obtained by means of solvent base coatings, which produce a maximum of 80% reflectance. The continuity of each coat means that the paper will have good resistance to the transfer of water vapor therethrough in the subsequent use to which such paper may be put, as for example, where a cut sheet such as 13c is used as a label on a container whose end portions are otherwise adequately sealed against the passage of moisture. The coating also protects the paper against scuffing, and in addition, helps make the product waterproof and improves its sealing capacity in respect of air, etc.

It will be understood that the coated paper product may comprise plain uninked paper having the coating of thermoplastic agent on one side. In many, if not most, instances, however, the product will be inked, as required in such applications as labels, overwraps, cartons, containers, etc. In this connection, it is contemplated that a paper web will be first printed with ink in a rotogravure press, and then coated with thermoplastic agent in accordance with the process illustrated in FIGS. 1 and 2. The coating thus protects the appearance of the paper product by preventing ink from being transferred over onto non-inked areas as by pressure from a user's fingers.

As indicated, the coated paper web 10 shown in FIG. 5 is illustrative of the products obtainable by the invention. Individual coated sheets such as 13c and 14c, if the paper is of suitable weight, may be used, say, as a wrapper, the marginal uncoated portions of each sheet being adapted to receive glue on the appropriate side thereof to enable the wrapper to be securely applied to a carton or other object.

If desired, the reverse side of web 10 of FIG. 5 may be coated with thermoplastic agent to improve the sealing strength of the cut sheets produced from such web. In other words, the agent on the reverse side would function as an adhesive. The agent may be deposited on the reverse side of only the marginal strip portions associated with each uncut sheet, or of only some of such portions, or it may be deposited on the reverse side of substantially the entire web, omitting only the trim portions for the sake of selling them as scrap. The agent may be the same as or different from that used to produce the high gloss coating. Thus, an agent for such reverse coating may be selected primarily for its sealing strength, or its hardness, or other particular desired property rather than for gloss. In order to coat the reverse side of the paper web, the coated web 10 leaving roll 25 of FIG. 1 and passing upwardly as shown, with the wax coating thereon indicated as 10a, may be passed over an idler roll 31, note FIG. 6, and then into the nip of etched roll 11″ and impression roll 12″, where thermoplastic agent from bath 19″ is applied, after which the web passes around cold roll 24″ and is peeled therefrom by means of the roll 25″. Doctor blade 21″ functions in the same way as blades 21 and 21′. It will be understood that the etched roll 11″ will have suitable etched areas for applying agent either to the marginal portions associated with each uncut sheet of the web or to substantially the entire surface of the web. As may be apparent, the apparatus of FIG. 6, with the exception of roll 31, is like that of FIG. 1.

Other products, in the form of continuous webs or cut sheets, are also within the scope of the invention. For example, a paper web comprising paperboard or a laminated packaging material may be coated to provide a smooth glossy finish on one side, and then the web may be cut into individual blanks, each suitable for making a folding carton. Before the web is cut, however, it may be so coated as to provide, on each cut blank, one or more uncoated areas which function as glue flaps; thus, when the blank is folded to form a carton or package, the uncoated areas will not be visible when the flaps are glued. If desired, both sides of the web may be so coated as to provide individual blanks having on one side a glossy coating and on the other side (which will be the inside of the resulting carton) a coating to provide moisture protection or other desirable properties.

The paper web may be two, three or more times wider than as shown in FIG. 5 to permit a plurality of parallel rows of product, such as the sheets 13c, 14c, etc., to be made. Rolls of appropriate width will of course be employed to process the wider webs.

A further and significant advantage of the invention is the high production rate, web speeds of at least 1200 ft per minute being attainable.

It is to be understood that the invention is not restricted to the specific details of the foregoing description, but is capable of obvious variations thereof without departing from its scope.

What is claimed is:

Apparatus for forming a continuous web severable into individual carton blank parts each having a portion of one surface thereof coated with glossy thermoplastic agent and another portion uncoated, comprising (a) an applicator surface having provided therein a plurality of closely spaced recesses which together form a pattern and which has at least one area outside the general outline of the pattern free of said recesses, (b) means for disposing molten thermoplastic agent only in said recesses and for leaving the area of said applicator surface between said recesses and outside the general outline of said pattern free of agent, (c) heated means for moving a portion of said web into contact with said applicator surface to transfer agent in said recesses to the surface of said web portion in a pattern corresponding to the pattern of said recesses and thereby selectively coat said web portion, (d) said heated means heating said pattern of agent on said web portion to maintain said agent in a plastic condition near its melting point and to cause said pattern to become substantially continuous while maintaining said area outside the general outline of said pattern substantially free of agent,
(e) an endless carrier having a smooth, mirror-finished, cooled surface,
(f) said heated means moving said coated web portion while being heated by said heated means into contact with said cooled surface and pressing said heated pattern on said web portion against said cooled surface to cause said pattern to adhere to said cooled surface, make said pattern more uniformly continuous at the initial point of contact with said cooled surface and rapidly harden it,
(g) said heated means comprising an impression roll disposed to form a nip both with said applicator surface and said cooled surface, said web being trained over the segmental surface of said impression roll extending between said nips, and
(h) means for peeling said web portion from said cooled surface.

References Cited

UNITED STATES PATENTS

| | | |
|---|---|---|
| 1,705,405 | 3/1929 | Hodler _____ 118—69 |
| 1,757,620 | 5/1930 | Decker et al. |
| 1,911,592 | 5/1933 | Supligeau et al. |
| 1,982,697 | 12/1934 | Royal _____ 118—40 |
| 2,117,200 | 5/1938 | Miller _____ 118—69 X |
| 2,249,088 | 7/1941 | Murray _____ 117—64 |
| 2,249,089 | 7/1941 | Murray et al. _____ 117—64 |
| 2,270,038 | 1/1942 | Corbin _____ 117—64 |
| 2,396,946 | 3/1946 | Grupe. |
| 2,443,221 | 6/1948 | Bergstein _____ 117—64 |
| 2,545,952 | 3/1951 | Goldman _____ 117—38 |
| 2,589,302 | 3/1952 | Snowman _____ 117—64 |
| 2,724,362 | 11/1955 | Burke et al. |
| 2,753,275 | 7/1956 | Wiles et al. _____ 117—119.2 X |
| 2,781,278 | 2/1957 | Harmon _____ 118—202 X |
| 2,829,980 | 4/1958 | Redd _____ 117—119.2 X |
| 2,877,140 | 3/1959 | Olstad _____ 117—111 X |
| 2,912,347 | 11/1959 | Yezek et al. |
| 2,982,245 | 5/1961 | Curler et al. _____ 118—69 |

ALFRED L. LEAVITT, *Primary Examiner.*

RICHARD D. NEVIUS, JOSEPH B. SPENCER,
*Examiners.*

J. P. McINTOSH, A. H. ROSENSTEIN,
*Assistant Examiners.*